United States Patent [19]
Cashman

[11] Patent Number: 6,157,836
[45] Date of Patent: Dec. 5, 2000

[54] PORTABLE COMMUNICATIONS AND DATA TERMINAL OPERATING TO OPTIMIZE RECEIPT OF BOTH INCOMING CDPD AND AMPS MESSAGES

[75] Inventor: Russell P. Cashman, Vista, Calif.

[73] Assignee: Pacific Communication Sciences, Inc., San Diego, Calif.

[21] Appl. No.: 09/163,410

[22] Filed: Sep. 30, 1998

Related U.S. Application Data

[62] Division of application No. 08/487,043, Jun. 7, 1995.

[51] Int. Cl.[7] .............................. H04Q 7/20; H04Q 7/00; H04B 1/10; H04B 15/00
[52] U.S. Cl. ............................. 455/436; 455/63; 370/331
[58] Field of Search .............................. 455/466, 63, 436, 455/513; 370/60, 331

[56] References Cited

U.S. PATENT DOCUMENTS

| | | |
|---|---|---|
| 3,564,150 | 2/1971 | Muller . |
| 3,575,558 | 4/1971 | Leyburn et al. . |
| 3,627,955 | 12/1971 | Stone, Jr. . |

(List continued on next page.)

FOREIGN PATENT DOCUMENTS

| | | |
|---|---|---|
| 0 439 926 A2 | 8/1991 | European Pat. Off. . |
| 0473 297 A2 | 3/1992 | European Pat. Off. . |
| 514 360 A2 | 11/1992 | European Pat. Off. . |
| 0521 609 A3 | 1/1993 | European Pat. Off. . |
| 0521610A2 | 1/1993 | European Pat. Off. . |
| 2239567 | 7/1991 | United Kingdom . |
| 2241 854 | 8/1991 | United Kingdom . |
| 2 260 064A | 3/1993 | United Kingdom . |
| WO 91/07044 | 3/1991 | WIPO . |
| WO 92/09178 | 5/1992 | WIPO . |

OTHER PUBLICATIONS

Badr, N.G., "Cellular Digital Packet Data CDPD", Computers and Communications, 1995., Conference Proceedings of the 1995 IEEE Fourteenth Annual International Phoenix Conference on, Mar. 28–31, 1995.
Booker, "Cellular Nets to Ride Analog Voice Lines" Computerworld, Jul. 26, 1993.
Wexler, "Moving Toward a Wireless Infrastructure" Computerworld, Oct. 11, 1993.
Wireless, "The Sky's No Limit", Nov. 1993.
Byte, "Cirrus Subsidiary Leads CDPD Push", Nov. 1993.
America On Line "Audiovox's MVX–800 Cellular Phone", Apr. 19, 1995.
America On Line "Orcle's Implementation of New Technology", May 8, 1995.
Wirbel, "Connecting the Wirless World", Electronic Engineering Times., Mar. 1, 1993.
Weber, "PCs On the Go Are Causing a Burst of Activity", Electronic Engineering Times, Mar. 29, 1993.
Telular, "Cellular for the PBX", Jan. 1993.
2,063,901, Application for Canadian Patent for : Cellular Data Overlay System, Inventors, Slekys, Arunas G. et al.
Hildebrandt, Bernhard, "Die Basistation im Zellularen Funkfernsprechnetz C450", 2323 Telcom Report, 1985, No. 5.

(List continued on next page.)

*Primary Examiner*—William Cumming
*Attorney, Agent, or Firm*—David L. Stewart; Steven A. Shaw; Peter J. Rutkowski

[57] ABSTRACT

A portable radio telephone handset operates as a data transfer terminal as well as an analog cellular telephone subscriber station. Two modes of operation, an analog cellular communication mode and a Cellular Digital Packet Data (CDPD) mode, are available in the handset. The handset distinguishes between paging signals indicating CDPD mode communications and those indicating analog cellular communications. The handset also automatically preempts CDPD communications in favor of analog cellular communications such as those carried out in an AMPS configuration. The handset maintains an active status on a CDPD communication channel during a "sleep mode", when the handset can carry out AMPS activity.

9 Claims, 7 Drawing Sheets

Microfiche Appendix Included
(2 Microfiche, 69 Pages)

U.S. PATENT DOCUMENTS

| | | |
|---|---|---|
| 3,906,166 | 9/1975 | Cooper et al. . |
| 3,976,840 | 8/1976 | Cleveland et al. . |
| 3,976,995 | 8/1976 | Sebestyen . |
| 4,005,388 | 1/1977 | Morley et al. . |
| 4,095,215 | 6/1978 | Mortimer . |
| 4,268,721 | 5/1981 | Nielson et al. . |
| 4,279,021 | 7/1981 | See et al. . |
| 4,352,955 | 10/1982 | Kai et al. . |
| 4,613,990 | 9/1986 | Halpern . |
| 4,661,972 | 4/1987 | Kai . |
| 4,802,200 | 1/1989 | Murata et al. . |
| 4,812,843 | 3/1989 | Champion, III et al. . |
| 4,825,456 | 4/1989 | Rosenberg . |
| 4,850,006 | 7/1989 | Sasaki et al. . |
| 4,947,420 | 8/1990 | Stahl et al. . |
| 4,962,523 | 10/1990 | Tanaka . |
| 5,008,925 | 4/1991 | Pireh . |
| 5,020,091 | 5/1991 | Krolopp et al. . |
| 5,054,052 | 10/1991 | Nonami . |
| 5,115,514 | 5/1992 | Leslie . |
| 5,117,449 | 5/1992 | Metroka et al. . |
| 5,119,397 | 6/1992 | Dahlin et al. . |
| 5,128,980 | 7/1992 | Choi . |
| 5,148,473 | 9/1992 | Freeland et al. . |
| 5,153,903 | 10/1992 | Eastmond et al. . |
| 5,166,973 | 11/1992 | Hoff . |
| 5,168,574 | 12/1992 | Gordon et al. . |
| 5,199,031 | 3/1993 | Dahlin . |
| 5,203,020 | 4/1993 | Sato et al. . |
| 5,212,722 | 5/1993 | Murata . |
| 5,228,074 | 7/1993 | Mizikovski . |
| 5,247,566 | 9/1993 | Hiramatsu . |
| 5,249,218 | 9/1993 | Sainton . |
| 5,253,287 | 10/1993 | Hasegawa . |
| 5,257,401 | 10/1993 | Dahlin et al. . |
| 5,265,270 | 11/1993 | Stergel et al. . |
| 5,274,699 | 12/1993 | Ranz . |
| 5,349,632 | 9/1994 | Nagashima . |
| 5,396,539 | 3/1995 | Slekys et al. . |
| 5,434,853 | 7/1995 | Hemmady et al. ............ 370/60 |
| 5,533,029 | 7/1996 | Gardner . |
| 5,544,222 | 8/1996 | Robinson et al. . |
| 5,548,805 | 8/1996 | Shpantzer et al. . |
| 5,574,979 | 11/1996 | West ............................ 455/63 |
| 5,594,943 | 1/1997 | Balachandran . |

OTHER PUBLICATIONS

Ehrlich et al., "Advanced Mobile Phone Service", Bell System Technical Journal, vol. 58, vol. 1, 1979, N.Y.

America on Line, "GTE Mobilnet", Jul. 11, 1995.

America on Line, "Sprint Cellular Announced CDPD Trial Systems", Jul. 12, 1995.

America on Line, "Limited Size Messaging (LSM) Protocol", Jul. 14, 1995.

America On Line, "HP Open Mail", May 9, 1995.

America On Line, "Integrated Voice and Cellular Digital Packet Data (CDPD) Network Analysis", Jun. 15, 1995.

PORTABLE COMMUNICATIONS AND DATA TERMINAL OPERATING TO OPTIMIZE RECEIPT OF BOTH INCOMING CDPD AND AMPS MESSAGES

This application is a divisional of application Ser. No. 08/487,043 filed Jun. 7, 1995 pending.

TECHNICAL FIELD

This invention relates generally to wireless communication devices. More particularly, the invention relates to switching wireless portable subscriber stations between both data and voice modes.

BACKGROUND OF THE INVENTION

The modern analog cellular system for mobile wireless duplex voice transmission is called "Advanced Mobile Phone Service" (AMPS). The AMPS cellular network uses the FCC assigned carrier frequency range of 800 to 900 MHz. Automobile-mounted cellular units transmit voice signals to a cellular base station within a given cell using up to one watt of power. Hand-held cellular units using battery power supplies transmit voice signals to a cellular base station within a given cell using up to one quarter watt of transmission power.

The analog human voice was the signal that the AMPS system was first designed to communicate. The AMPS system was optimized for carrying as many analog voice signals within a given bandwidth of a channel as possible. Mobility of the cellular telephone using low power mobile units, FM modulation, and the higher carrier frequency range (800 MHz–900 MHz) is achieved through a cellular arrangement of base stations whereby a user's signal is handed off to the next cell site as he or she moves into a different cell area. This cellular hand-off can cause a temporary loss in transmission or reception. However, temporarily losing a voice signal is not critical because a user knows when there is a signal loss and the voice information can be retransmitted. However, signal loss, even though temporary, poses special problems for transmission of digital data. Some other AMPS cellular problems causing loss in voice signals are drops in signal strength, reflections, Rayleigh fading, and cellular dead spots.

The availability of portable computers naturally led to the desire to conduct wireless transmission of digital data from a remote location. Presently, the AMPS voice cellular system is being used to transmit digital data in the form of circuit-switched cellular data across AMPS carrier channels. Raw (baseband) digital data must be converted so that it can be transmitted and received across the analog AMPS system. One disadvantage to using the AMPS system for data transmission is that a narrow channel bandwidth and errors in transmission limit the baud rate for transmitting and receiving the digital data. As previously stated, loss of raw digital data may be caused by other problems in the AMPS mobile cellular system.

Heretofore, providing efficient wireless communication of both voice and data signals in an integrated package has been difficult. Furthermore, it is difficult to integrate the features of AMPS voice transmission with applications such as data transmission, electronic mail, duplex paging, as well as the provision of a circuit-switched cellular data interface such as a wireless fax-modem, into a single hand-held battery operated wireless unit. This has been accomplished in part by the Cellular Digital Packet Data (CDPD) system described in the CDPD specification, Version 1.1, incorporated herein by reference as background material. The CDPD communication system shares the same carrier frequencies assigned to the AMPS channels as described in Part 405, Version 1.1 of the CDPD specification.

The base unit or mobile data base station (MDBS 1, as illustrated in FIG. 1), of a CDPD system utilizes a channel within an AMPS cell to establish a link and communicate to a user's mobile end system. The MDBS may use other frequencies outside of AMPS that are made available to it by service providers. The mobile end system (M-ES 2) is a portable computer, hand-set or other portable electronic device containing a subscriber communication unit. The MDBS serves as a communication link between the user of the subscriber station M-ES 2 and a service provider's network of wire lines, microwave links, satellite links, AMPS cellular links, or other CDPD links (such as mobile data intermediate system MD-IS 3 and intermediate systems 4, 5, 6) to convey data to another mobile end system, computer network, or non-mobile or fixed end-user system (F-ES 7, 8).

The CDPD network is designed to operate as an extension of existing communication networks, such as AMPS networks and the Internet network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually based on the destination address carried in the packet and knowledge of current network topology. The packetized nature of the data transmissions from an M-ES 2 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD station in a given sector (transmitting range and area of a standard AMPS base station transceiver).

The airlink interface portion of the CDPD network consists of a set of cells. A cell is defined by the geographical boundaries within the RF transmission range from a fixed transmission site such as MDBS 1, which can be received at acceptable levels of signal strength by mobile subscribers such as M-ES 2. The transmitter supporting the cell may be located centrally within the cell, with transmission being carried out via an omni-directional antenna, or the transmitter located at the edge of a cell and transmitted via a directional antenna. This second type of cell is also referred to as a sector. In typical configurations, the transmitters for several sectors are co-located. The area served by a set of cells has some area overlap so that a roaming mobile end system can maintain continuous service by switching from one cell to an adjacent cell in a manner roughly analogous to the standard hand-off in an AMPS system. The two cells are considered to be adjacent if an M-ES can maintain continuous service by switching from one cell to the other. This switching process, called cell transfer, is done independently of normal AMPS hand-off procedures.

In FIG. 1, the interface (A) between the mobile end system 2 and the MDBS 1 is an "air interface" constituted by a radio frequency link using standard AMPS frequencies.

The MDBS 1 is connected to other mobile data base stations through a mobile data intermediate system (MD-IS) 3. A number of mobile data base stations can be under the control of a single mobile data intermediate system. The mobile data intermediate systems are connected to each other through intermediate systems such as 4 and 5 in FIG. 1.

The intermediate systems are constituted by at least one node connected to more than one sub-network (such as intermediate system MD-IS 3). The intermediate system has a primary role of forwarding data from one sub-network to another. The mobile data MD-IS 3 performs data packet routing based on knowledge of the current location of each mobile end system within the range of the mobile data base stations under the control of the MD-IS. The MD-IS is the only network entity that is "aware" of the location of any of the mobile end systems. However, under some circumstances (as defined by the CDPD specification, Version 1.1 incorporated herein as background material), particular mobile data base stations will keep track of behavior of specific subscriber stations. A CDPD-specific Mobile Network Location Protocol (MNLP) is operated between each MD-IS (through the intermediate system) to exchange location information regarding the mobile end systems.

The overall CDPD network is controlled by a network management system (NMS) 10 having an interface with at least one mobile data intermediate system 3. Using a special protocol, programming instructions can be transmitted from the NMS 10 through the MD-IS 3 to any number of mobile data base stations under proper conditions.

Such programming instructions can be used to convey useful network data to the MDBS, as well as configuring the operation of an MDBS with respect to such critical features as maintaining channel queues. The NMS also controls other CDPD system characteristics such as the timing of paging messages to coincide with the non-dormant periods of the M-ES hand-sets. One advantage of the subject CDPD system is the capability of providing operating instructions to mobile data base stations from the NMS 10 through an MD-IS 3, or by a direct connection to the MDBS as is outlined in the detailed description of the MDBS architecture found in the CDPD specification, Version 1.1, Parts 402 and 403.

FIG. 2 depicts a comparison between the CDPD network illustrated in FIG. 1 and the standard AMPS network. The MDBS 1 is the CDPD equivalent to an AMPS base station 21. Both serve as links to mobile users, 2, 2', and 2" for the CDPD system and 22, 22" and 22" for AMPS users. 10 Both AMPS and CDPD functions can be handled by the same hand-set or end system equipment. Also, the MDBS 1 is preferably located with the AMPS base station 21 as will be explained in greater detail later.

The MD-IS 3 which acts as a local controller for the CDPD mobile data base stations connected thereto is equivalent to the mobile telephone switch office (MTSO) 23 used to control a plurality of AMPS base stations 21, 21' and 21". In the AMPS system, the MTSO 23 can be connected to the various base stations 21, 21', 21" by way of communication links, either over dedicated landlines or through a Public Switched Telephone Network (PSTN). Likewise, the connection between MD-IS 3 and the various mobile data base stations 1, 1', 1" controlled thereby is made in the same manner. However, different signaling protocols are used than those found in the AMPS system.

In comparison to AMPS, the infra-structure requirements of CDPD are very small. The CDPD base station equipment is located (preferably) at a cellular carrier's cell site along side existing AMPS base station cellular equipment. The multiple access nature of the CDPD system makes it possible to provide substantial CDPD coverage to many users simultaneously with the installation of only one CDPD radio in a given sector. This multiple access is the result of a mobile end-system accessing the CDPD channel only when there is data to be sent.

The AMPS base station and the MDBS can use the same RF equipment if both are co-located. By contrast, the MTSO of the AMPS system and the MD-IS of the CDPD system do not have to be co-located in order to share RF links. In the AMPS system, the MTSO 23 has the responsibility of connecting the AMPS base station and the mobile station to another party through a PSTN 24. The intermediate system 4 of the CDPD corresponds to the use of the PSTN by the AMPS system. Like the AMPS system, the CDPD system must also use the public switch telephone network or another landline network for completing calls to remote parties or systems via a phone system terminal network 28. However, the CDPD system employs a different protocol than that used by the AMPS system for completing calls over a PSTN.

In general, the CDPD system illustrated in FIG. 1 operates to provide service to manage data communications to subscribers over a wide geographic range. When a mobile end system is located in its home area, data packets are routed directly to and from it by the home MD-IS via the home MDBS. The route via which data packets are forwarded to and from a mobile end system or subscriber station changes when the mobile end system moves out of its home area.

The MDBS maintains zero or more (up to the MDBS transmission capability) channel streams across the airlink interface, as directed by the MD-IS controlling that MDBS. The MDBS instructs all subscriber units to change channels when necessary such as when an AMPS communication is detected on the CDPD channel. Each subscriber unit's terminal stream is carried on one channel stream at a time, normally selected by the mobile subscriber, preferably based upon data received from the MDBS regarding optimum channels for CDPD use. The forward and reverse traffic in a given cell (the terminal stream of the MDBS) is carried on a single DS0 trunk, between the MDBS and the MD-IS. Communication between the MDBS and the MD-IS over the DS0 trunk follows standard formats such as T1.

Within the CDPD network, digital data is transmitted between the MDBS and the M-ES using Gaussian Minimum Shift Keying (GMSK) modulation. Transmission from the base station to the subscriber station M-ES are continuous. Transmissions from subscriber station M-ES to the MDBS use a burst mode in which subscriber station M-ES only accesses a channel when it has data to send and the channel is not being used by other mobile subscriber stations. This allows a multiple mobile subscriber stations to share a single channel, and for data transmission characterized by intermittent transactions of relatively small amounts of data, thereby greatly reducing the connection time compared to that when sending digital data over conventional circuit-switched cellular modems.

Unlike the signaling schemes used in conventional cellular modems, which have been chosen based on the need to operate within the constraints of the existing voice signaling system, the GMSK modulation technique used for CDPD communication was explicitly selected with the intent of obtaining both very high bit transmission rates and very good error performance in cellular channels. The fact that the choice of modulation was not constrained by a preexisting signal structure allows CDPD systems to achieve substantially greater instantaneous bit rates at very low received signal levels when compared to those of conventional cellular modems. This means that CDPD communication systems will provide reliable, high speed data transmission in many areas where signal quality is inadequate for good cellular modem performance. Presently the raw (baseband) digital data being transferred across CDPD include electronic mail messages, digital fax data, or digital data representing a network connection such that files may be transferred as if currently connected to a local area network.

The mobile data intermediate system MD-IS 3 handles the routing of packets for all visiting mobile end systems in its serving area. Two services are performed by the MD-IS: a registration service maintaining an information base of each M-ES currently registered in a particular serving location; and a re-address service, decapsulating forwarded packets and routing them to the correct cell. The serving MD-IS also administers authentication, authorization and accounting services for the network support service applications.

A CDPD communication system can operate with dedicated channels set aside from the pool of cellular voice channels and reserved for CDPD use. In the alternative, in a more typical mode of operation, the CDPD communication system can use idle time on channels that may also be used by AMPS communications. In this second case, the mobile data base station may perform "RF sniffing" to determine which channels are available and to detect the onset of voice traffic on the channel currently being used for CDPD communication. If an AMPS cellular unit begins transmitting on a channel occupied by a CDPD communication, the CDPD unit ceases transmitting on that channel and switches to another available channel (a process called "channel hopping") or if no other channel is available, ceases transmission until a channel becomes available for CDPD use.

Although the CDPD system shares existing AMPS radio frequency channels, as stated above, AMPS calls are given first priority, and they are always able to pre-empt the use of any channel being used by CDPD. However, the cellular service provider may opt to dedicate one or more channels to CDPD usage. In this case, AMPS calls will never attempt to pre-empt the channels dedicated to CDPD use.

In a normal operation of the MDBS carrying out channel hopping, the MDBS functions the monitor activity on AMPS channels. The MDBS maintains a list of the status (occupied voice or unused) for each channel available for CDPD use at the cell. The MDBS selects a channel for CDPD use from the unused channels in the list based on a combination of criteria (not specified in the CDPD standard). These could include such considerations as: the likelihood that the channel will be required by the voice system in the near future; the amount of interference present on the channel; the amount of interference that the CDPD communication is likely to cause to other voice users in different cells, or on other sectors; or, other factors. The MDBS transmits a list of all channels available for CDPD use (whether currently occupied by a voice communication or not) to the subscriber stations. The MDBS may execute a channel hop before the channel is pre-empted by AMPS communication if the MDBS determines that another channel is more suitable. In such a case, the MDBS sends a message to the subscriber stations commanding them to change to the specific channel selected, and then the MDBS executes the hop. This sort of hop is much more orderly and efficient since the subscriber stations do not have to search for the next channel.

If the present CDPD channel is pre-empted by AMPS communication, the MDBS selects another channel from those unused by AMPS communications and immediately hops to it without informing the subscriber station. The subscriber station then determines that the CDPD signal is no longer present on the current channel and searches the other channels in the list to determine the channel (if any) to which the CDPD communication has hopped.

The CDPD system has the capability of easily interfacing with the existing AMPS system and sharing some front-end equipment with it. To take advantage of this capability, the MDBS must have the capability of physically interfacing with existing AMPS base stations. Consequently, the MDBS should be small, non-obtrusive, and easily accessible without interrupting existing AMPS equipment. The MDBS has to be configured so as to easily be connectable to equipment outside the MDBS normally shared with the AMPS system. This external equipment found in the AMPS base station includes an antenna system, RF power amplifiers (in particular, linear amplifiers can be shared with existing AMPS), RF multicouplers, power splitters, duplexers, and, optional equipment. Since the MDBS shares the environment of the AMPS base station, the MDBS should not constitute a substantial additional burden upon such support systems as environmental control and maintenance. Thus, the MDBS must be compact and flexible, constituting only those elements necessary for carrying out the MDBS functions necessary at that cell site.

The use of an effective CDPD system has brought about a problem in that a subscriber station must attempt to monitor for incoming calls on both CDPD and AMPS communication systems. If the subscriber station adheres to the timing of the CDPD system, it is likely that incoming AMPS communications will be ignored, despite the pre-emption given to AMPS communications over CDPD communications. And while priority can be given to monitoring for AMPS communications, it is probable that CDPD communications directed to a subscriber station will be lost despite the fact that the CDPD system can buffer incoming paging signals for sleeping CDPD subscriber stations. Existing CDPD communication systems and existing AMPS communication systems fail to provide efficient monitoring of both modes of communications to prevent loss of incoming calls.

BRIEF SUMMARY OF THE INVENTION

One advantage of the invention is in facilitating efficient switching between data communication and voice communication without loss of data communication where voice communication has priority.

A further advantage is in operating the wireless subscriber station in a manner minimizing loss of both incoming AMPS and CDPD communications.

Another advantage of the invention is to efficiently perform a hand-off operation of a wireless subscriber station in a CDPD communication system without losing incoming CDPD AMPS calls.

These and other advantages of the invention are achieved by a subscriber station arranged for communication with an analog cellular voice communication system and a CDPD communication system, where the CDPD system includes first time adjustment means for selecting a first time interval between consecutive CDPD paging messages sent from the CDPD communication system to the wireless subscriber station. The wireless subscriber station includes means for controlling operation and analog cellular voice communication and means for controlling operation of CDPD communication. The subscriber station also has a second time adjusting means for selecting a second time interval starting at a most recent CDPD communication and ending when the wireless subscriber station is expected to enter a CDPD sleep mode. The subscriber station also includes means synchronizing the first and second time intervals to determine respective CDPD and analog cellular operation schedules. The wireless subscriber station then selects operation of one or the other both of the means for controlling communication based upon the operating schedules for CDPD and analog cellular communications.

As another aspect of the invention, a wireless subscriber station is arranged for communication with analog cellular voice and CDPD communication systems where the CDPD communication system includes first timer means for measuring a first time interval specifying the time between consecutive CDPD paging messages sent from the CDPD communication system to the wireless subscribe station. The CDPD communication system also includes second timer means for measuring a second time interval specified in the time between a CDPD system response to a polling signal from the subscriber station and expected entry of the subscriber station into a CDPD sleep mode. The subscriber station includes means for controlling operation of an analog cellular voice and CDPD communications, means for measuring the first and second time intervals, and means for synchronizing the duration of the first and second time intervals with the CDPD communication system. The wireless subscriber station also includes means for determining respective CDPD and analog cellular operation schedules for the subscriber station based upon the first and second time intervals, selecting operation of one, the other or both of the means for controlling communication based upon the operating schedules.

In accord with a further aspect of the invention, a method for communicating between a wireless subscriber station and both an analog cellular voice communication system and a CDPD communication system provides a subscriber station arranged to monitor both incoming analog cellular voice communications and incoming CDPD communications. The method includes the steps of registering the subscriber station with an analog cellular voice communication system and CDPD system. The CDPD registration system includes synchronizing a first time interval between the subscriber station and the CDPD system where the first time interval defines when the subscriber station is expected to be on the CDPD channel. In the next step of the CDPD registration, the subscriber station is switched from the CDPD channel to an analog cellular voice communication control channel to monitor for incoming analog cellular voice communications directed to the subscriber station. In final step, the subscriber station is switched back to the CDPD channel before the end of the first time interval.

As yet another aspect of the invention, a method for operating a wireless subscriber station in a CDPD system includes selecting at the wireless subscriber station a first time interval beginning at the completion of the most previous CDPD communication between a subscriber station and a CDPD system and ending when the subscriber station is expected to enter a CDPD sleep mode. The wireless subscriber station synchronizes with the CDPD communication system so that the subscriber station, along with the CDPD system, measures a plurality of second time intervals, wherein the second time intervals selected by the CDPD system define a duration of time allowed to the subscriber station before registration. The subscriber station monitors incoming CDPD communication on a CDPD channel during the first time interval. Then, the subscriber station changes modes to monitor incoming cellular analog voice communications on a cellular analog voice control channel for a plurality of second time intervals. Finally, the subscriber station changes modes to monitor incoming CDPD communications on the CDPD channel before expiration of the last of the plurality of second time intervals.

In a still further aspect of the invention, the objects are achieved by a method of effecting handoff of a wireless subscriber station from a first cell to a second cell of a CDPD communication system is performed. A subscriber station contains a cell transfer database pertaining to the first cell, and registers in the second cell of the CDPD system by sending a polling receiver ready (RR) signal to a MDBS of the second cell. The subscriber station determines a first time interval for a complete Received Signal Strength Indication (RSSI) scan of the second cell. The subscriber station divides the first time interval into a plurality of overlapping sequential time slots. The subscriber station then alternately scans for CDPD activity and analog cellular voice communication activity on alternating time slots for the duration of the first time interval. The information derived from this scanning creates a second cell transfer database for the second cell. Once this Second cell transfer database has been obtained, the first cell transfer database is discarded.

DETAILED DESCRIPTION OF THE PREFERRED EMBODIMENTS

Figure 1:
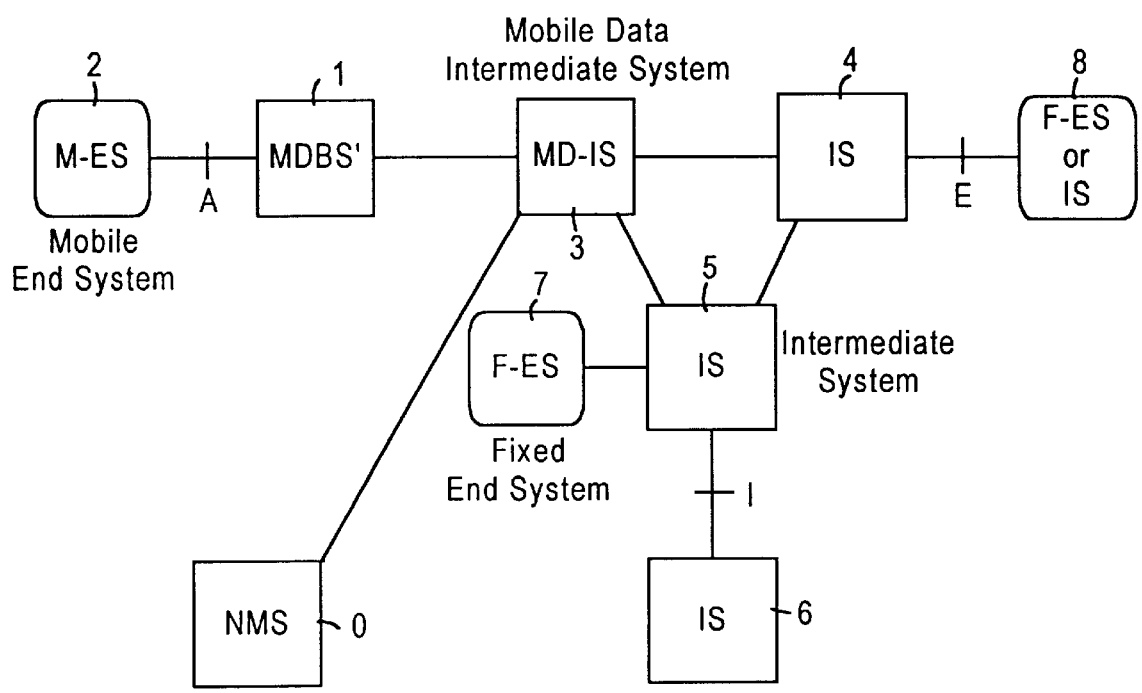
FIG. 1 is a block diagram of a CDPD system.
Figure 2:
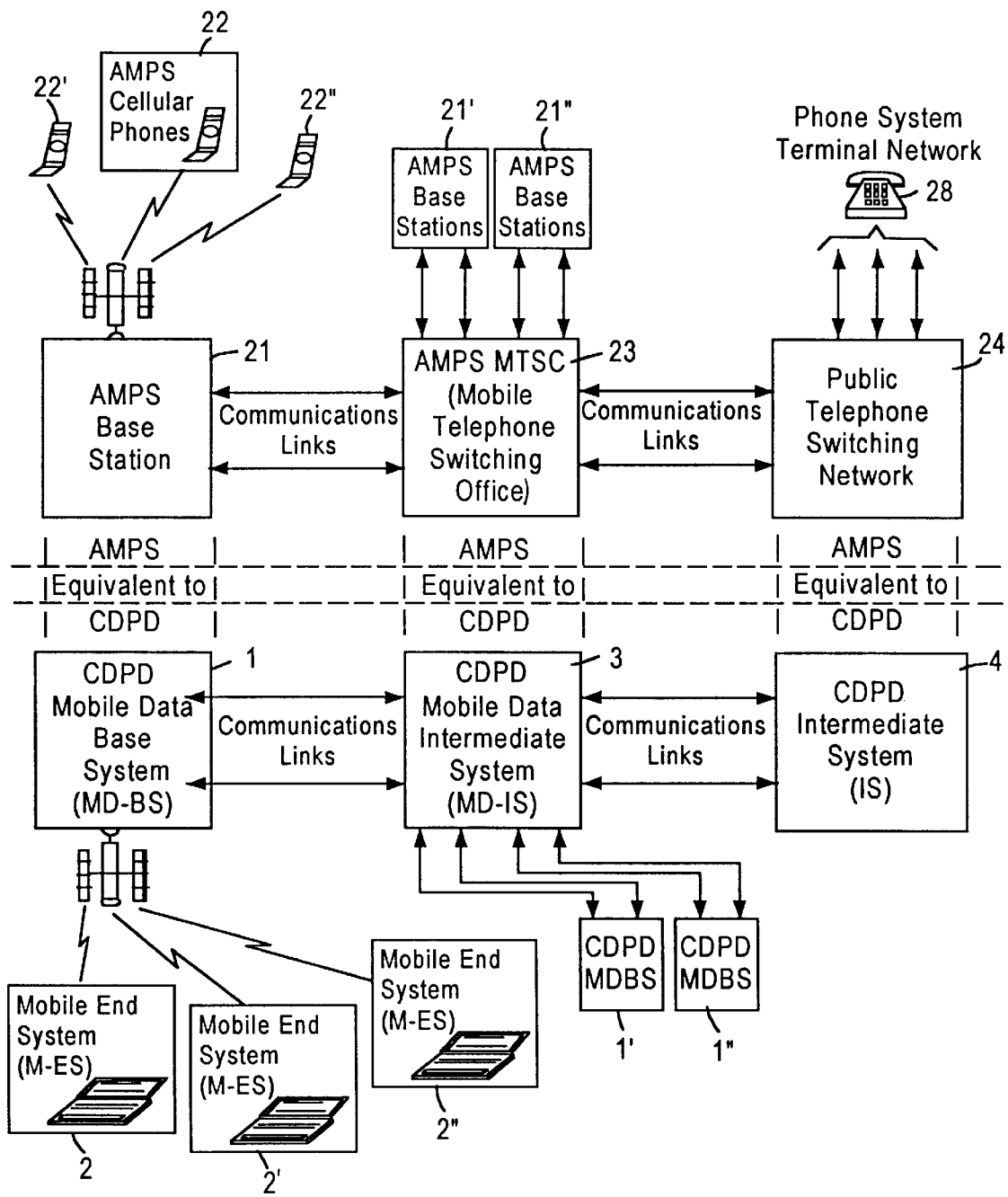
FIG. 2 is a block diagram correlating the CDPD system to an accompanying AMPS system.
Figure 3:
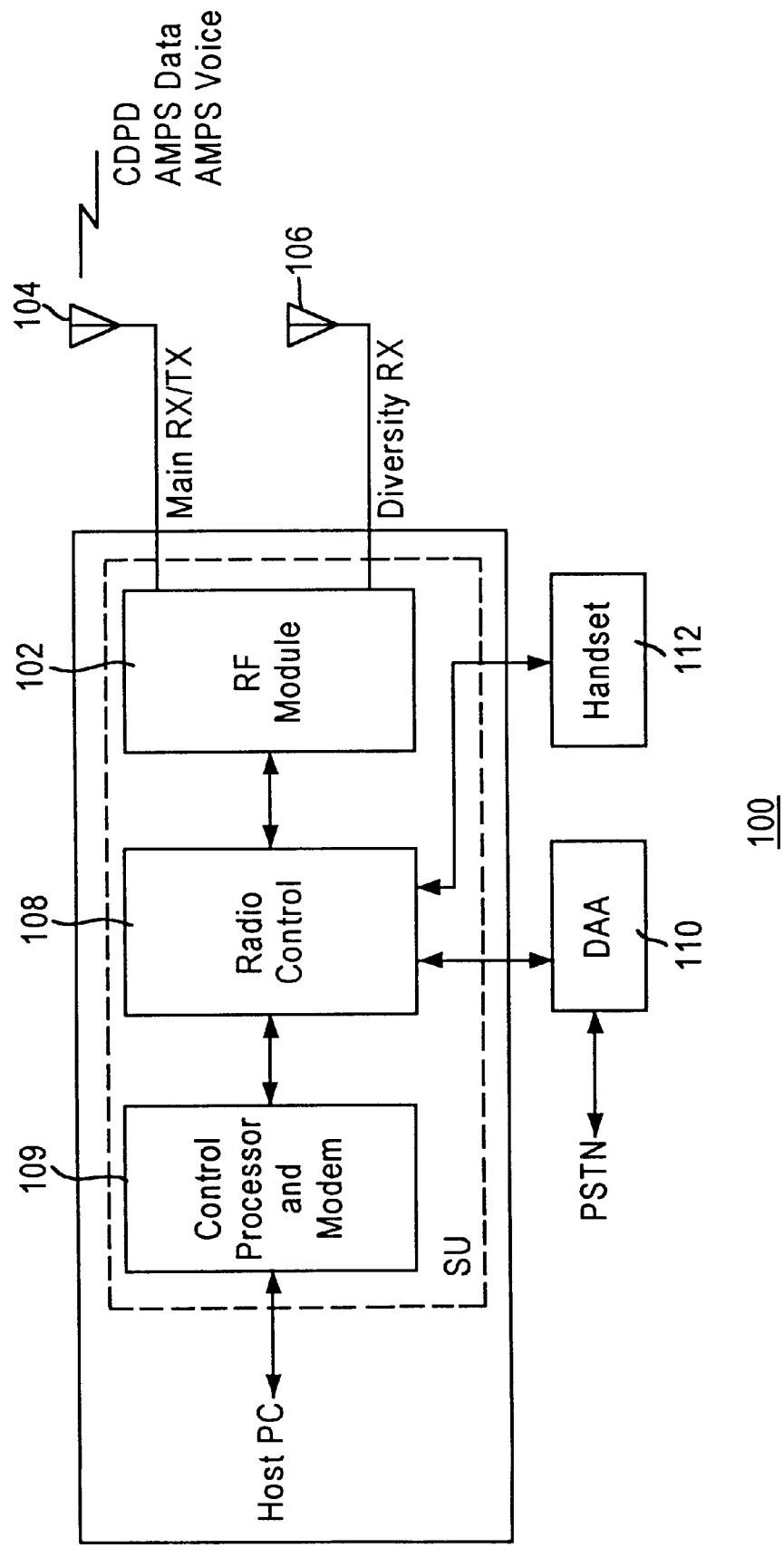
FIG. 3 is a block diagram of a portable radio telephone handset.

Achievement of the advantages of the present invention is facilitated by the device of FIG. 3. Depicted is a block diagram of the portable communication terminal handset 100 of the present invention. In most respects this portable communication terminal is similar to conventional portable radio telephone handsets in that it includes a radio frequency module 102 having at least one radio frequency transceiver. The radio frequency transceiver uses a main antenna 104 for both receiving and transmitting the various types of signals handled by the portable terminal, such as AMPS data (circuit switched cellular data) communication, AMPS voice communication and CDPD communication. A diversity antenna 106 is used as a backup to maintain reception under certain adverse conditions. A telephone type handset 112 is used to facilitate AMPS voice communication.

The portable terminal can also be patched into a local public switch telephone network (PSTN) by way of a digital-analog access interface (DAA) connected to the radio control processor 108. This processor, along with control processor and modem 109, divides the various control functions of the portable terminal including call setup, high level protocol, low level protocol, power adjustment, modem operation and data transfer between an external host computer. To facilitate ease of subscriber use, the host computer can be a personal computer (PC) or personal digital assistant (PDA) or other electronic device. The connection hardware of the portable terminal is of a standard type normally used with PC external connectors.

Figure 4:
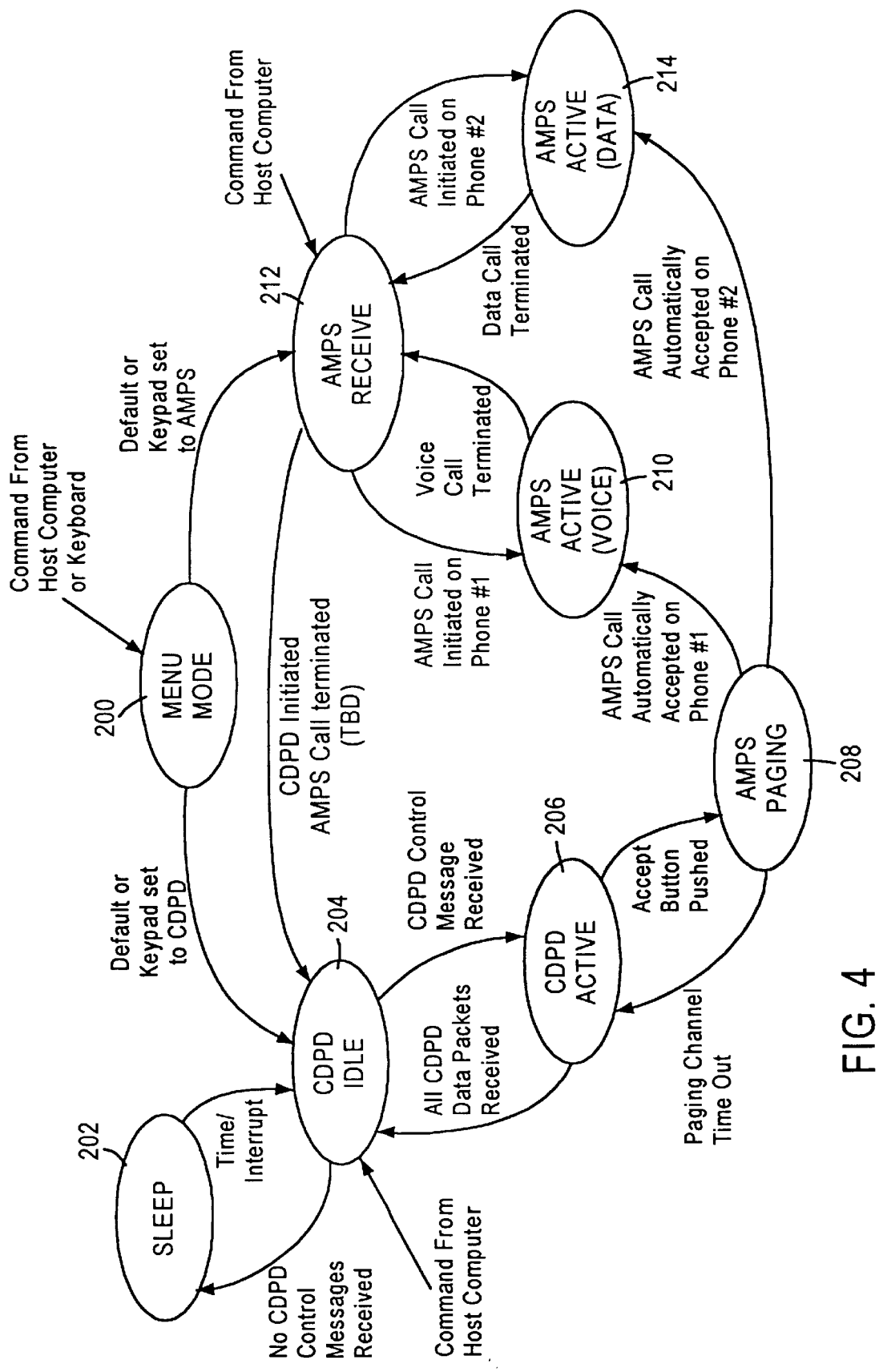
FIG. 4 is a representation of the operating modes available to the handset supporting the present invention when used in the appropriate CDPD communication system.

The portable data terminal handset and subscriber station as depicted in FIG. 3 can be configured to permit all the modes of operation illustrated in FIG. 4. The circle designated as 200 in FIG. 4 represents the menu mode selection by either the operator or programmer of the portable data terminal handset. Either of the two modes (AMPS or CDPD) can be selected by an operator using a key pad on the handset. If data is being entered into the portable terminal (handset) 100 by a host computer, either the mode or the predetermined default setting can be selected as part of that data transfer.

For best results, the illustrated system is normally in a low-power "sleep" mode as indicated at 202. This "sleep" or dormant mode results in the least amount of power expenditure. Normally, the "sleep" mode will be interrupted every 10–255 seconds to check for messages such as incoming paging signals. If none are received, the CDPD mode remains idle as indicated at 204. The CDPD can be rendered active as indicated at 206 by the receipt of a paging signal, a command from the host computer or the handset user to initiate data transfer in the CDPD mode. The advantage of remaining in the CDPD mode is that the battery is not heavily burdened so that, based on current battery technology, talk time at full transmission power is greater than one hour and standby time while monitoring the AMPS control channel is greater than 12 hours.

Sleep mode procedures are used to place the handset in the sleep mode referred to previously. The sleep mode is defined as an optional mode of operation that might be requested by a subscriber station M-ES during the data link establishment procedure (communication between the mobile end station and mobile data intermediate system). The sleep mode is intended to assist power conservation strategies in the mobile end station. The general operation of the sleep mode permits an M-ES to disable or power-down its receiver and associated circuitry. This mode is a key advantage of CDPD operation.

The sleep mode procedure operates in the "multiple frame established state". In this operation, if no frames are exchanged on the data link connection between a particular subscriber station M-ES and the MDBS after a period of time defined by the parameter T203, the data link connection may be placed in the Temporary Equipment Identifier (TEI) indicative of the sleep state for the handset. While in this state, the overall network will not attempt to transmit information destined for that M-ES. If, after entering the sleep state, new frames become extant and waiting initial transmission, the network will broadcast a predetermined message at periodic intervals. This message contains a list of TEI's for which channel data is pending. The mobile end stations are expected to wake up at periodic intervals to determine if data from them is pending, and notify the network that they are willing to receive the pending data. Normally, the M-ES may exit the sleep state at any time.

Parameter T203 represents the maximum time allowed without frames being exchanged on the data link is connection before the M-ES is expected to enter the CDPD sleep mode. On the user/subscriber (M-ES) side, timing of the parameter T203 is started or restarted upon transmission of a data link layer frame of any type on the reverse channel (from the M-ES to the MDBS). On the network side, the timing of parameter T203 for a particular M-ES is started or restarted upon receipt of a data link layer frame (of any type) on the CDPD channel. If the value of parameter T203 expires, the data link entity will enter the TEI sleep state, and issue an indication of this state from the user's side. The layer management entity may take power conserving measures, such as disabling the radio receiver or other non-essential portions of its circuitry.

A second parameter, T204, represents the time intervals at which the network side broadcasts TEI notification of pending data for a sleeping M-ES. A single timing operation for parameter T204 is maintained for a channel stream; all user side management entities discover and synchronize to particular channel streams T204, via the TEI notification procedure described in Part 6.8.8 of Part 403 of the CDPD specification. The number of frames queued in the maximum time for which the network attempts to notify an M-ES in the TEI sleep state is implementation dependent. The network releases a data link connection and discards and queued frames for which the TEI sleep notification procedures are aborted. The maximum number of attempts to notify an M-ES in the TEI sleep state of pending network transmissions is designated system parameter N204. The network normally aborts a TEI sleep notification procedure for a TEI which has been included in a number of successive TEI notification messages (expressed as parameter N204) without a response from that M-ES. Consequently, the subject M-ES will be de-registered with the CDPD system.

A complete description of the aforementioned operation is found in Part 6.8 of Part 403 of the CDPD specification, incorporated herein by reference as background material. The parallel operation of the M-ES and the MD-IS is depicted in the parallel flow charts of FIG. 5. Both units recognize when the last CDPD communication by a particular subscriber at an M-ES took place. In this respect, both the M-ES and the MD-IS can be synchronized to each other. Using internal clocks, both units keep track of the time elapsed since elapse of the most recent CDPD communication between the M-ES and the MD-IS, as indicated at step 702. Thus, in operation according to this Section of the CDPD specification, if no data is sent in either direction over the air link for a certain length of time (parameter T203), the M-ES will go into the sleep mode and the network will assume that the M-ES is asleep, as indicated at step 703. Once the M-ES enters the sleep mode another timing operation is carried out in both the M-ES and the MDBS.

The length of this period is defined by the parameters T204 and N204, previously described. If the network has data to deliver to the M-ES that is believed to be asleep, the network will add the TEI for that M-ES to a list of sleeping units on a particular channel stream, that have data waiting for them. However, the network will not send that data (step 704). For each time frame defined by the parameter T204, the network will send a TEI indication for a particular subscriber unit M-ES indicating that there is data waiting for that subscriber station. Thus, the subscriber station will have to be monitoring the CDPD channel at some time during the time frame defined by T204 in order to determine if a message is waiting for that subscriber station.

The list of subscriber stations having waiting messages is broadcast to all units on that channel stream periodically in a TEI notification message. The time between such notification is specified by the parameter T204. This parameter determines the length of time the M-ES is expected to sleep before "waking" for its messages. When the M-ES awakens, it waits until it receives a notification message. If the TEI of that M-ES is on the list, it notifies the network that it is ready to receive data. If the TEI of a particular M-ES is not on that list, that M-ES goes back to sleep for another period of time, preferably specified by the parameter T204. If a consecutive number of notifications (specified by the parameter N204) have been made for a TEI without the subject M-ES indicating that it is ready to receive data, the network will then assume that the M-ES is no-longer present on the CDPD system and discards the data that was pending for that M-ES, as indicated at step 705.

One drawback of this operation is that the system ignores cases where the M-ES has moved into a new cell or the CDPD channel has hopped away while the M-ES was in the sleep mode. Also, if the particular M-ES is handling normal AMPS communication for a greater amount of time than that encompassed by the parameters N204×T204, then the data that is being held for that M-ES is discarded by the network. Thus, CDPD communication is lost due to the normal operation of AMPS communication.

In the normal operation of the CDPD system, the subscriber station M-ES cannot unilaterally control its own parameter T203 (the time after which the M-ES will go "Ito sleep" if no data is sent in either direction over the arrow link). The subscriber station must request a value of T203 from the CDPD system. Also, the parameters T204 and N204 are not normally controlled by the M-ES in a CDPD network. Rather, control of these parameters resides within the network, possibly with the mobile data intermediate system to which a particular M-ES is currently assigned. Consequently, in normal CDPD operation, the user of an M-ES cannot make the necessary adjustments to compensate for extended AMPS use by adjusting the T203, or any other parameter.

This situation is remedied by the operation of the first embodiment of the present invention. This includes a process of leading the CDPD network to "believe" that the M-ES was asleep, during which time the M-ES could enter the AMPS mode (including tuning its radio to another channel, if necessary) and perform AMPS functions. After these AMPS functions are complete, the M-ES re-enters the CDPD mode and notifies the CDPD network that it was now ready to receive any data that had been pending (by virtue of the TEI of that M-ES being on the list of sleeping stations).

Figures 5A, 5B:
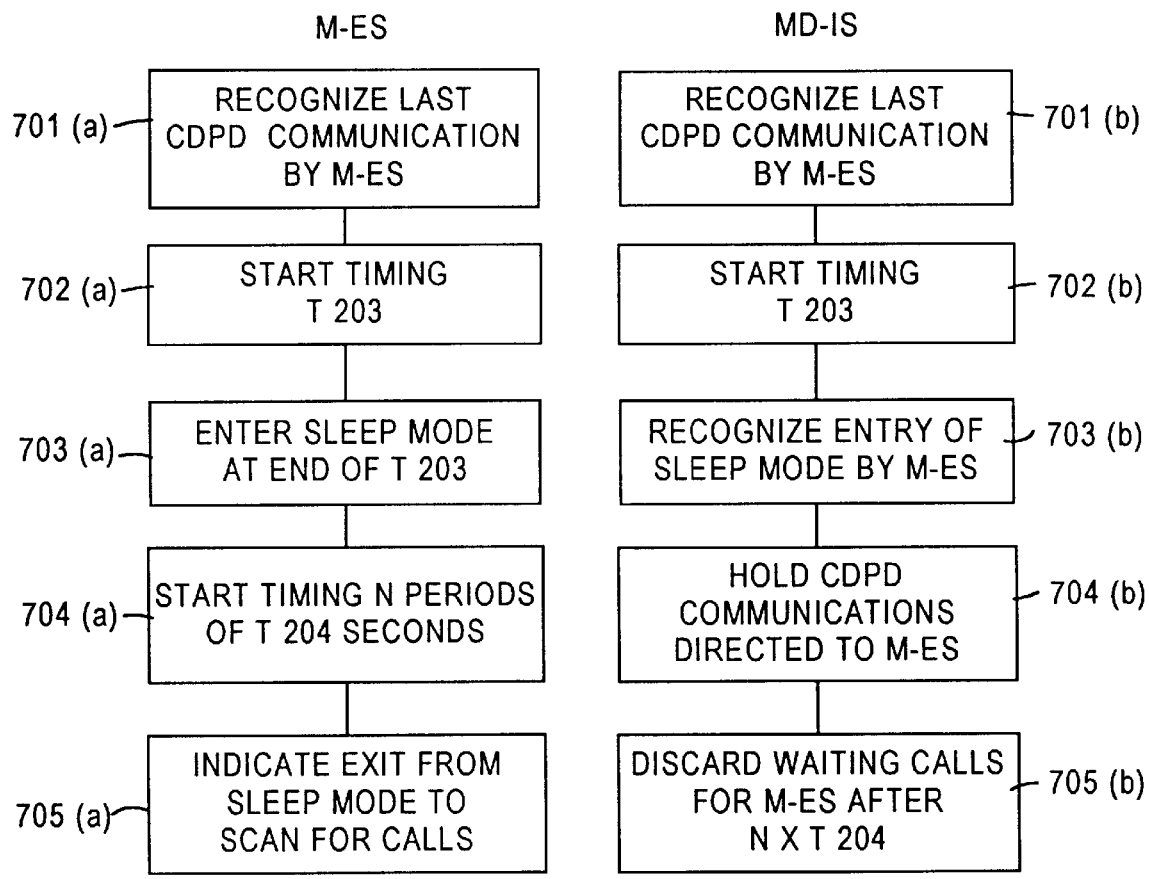
FIGS. 5A and 5B are flow charts depicting parallel operation for the handset and the Mobile Data Base Station (MDBS) used to carry out the present invention.

Referring to the arrangement depicted in FIG. 5, the subscriber station M-ES appears to enter the sleep mode at steps 703(*a*). However, rather than remaining in the CDPD sleep mode, the subscriber station switches modes, and tunes to an AMPS control channel to monitor AMPS activity. The frequency at which the subscriber station M-ES checks for AMPS activity is based upon the frequency at which the AMPS system sends paging messages indicative of the desired AMPS communication to the subscriber stations. Of course, the subscriber station M-ES has to be "cognizant" of the timing of parameter T204, dictating the frequency at which the TEI message is sent from the CDPD network to the subscriber stations. By recognizing the timing of parameter T204 and N204, the subscriber station M-ES switches over from the AMPS mode to periodically check for CDPD paging signals.

The aforementioned operation is not entirely comprehensive of the full range of activity available to a subscriber station when switching between CDPD and AMPS modes. Since AMPS mode operation is recognized as having preference over CDPD mode operation, the handset preferably spends most of its time monitoring for AMPS communication and just enough time in the CDPD mode to pick up indication of messages for a subscriber station and avoid de-registration. Consequently, one mode of operating subscriber station M-ES involves remaining in the AMPS mode monitoring an AMPS control channel while periodically breaking away to poll the CDPD network.

When breaking away from the AMPS mode, the subscriber station M-ES sends a polling signal to the CDPD network to evoke a response and determine if there is any data waiting on the CDPD network for transmission to that subscriber station. After listening for an appropriate amount of time for a return message from the CDPD network, the subscriber station then switches modes and tunes back to the AMPS channel. Preferably this switch-over occurs before any re-transmission of relevant AMPS pages that might have been missed while the subscriber station was in the CDPD mode. The time frame during which the subscriber station must wait after sending the polling signal from the CDPD network is defined by parameter T203. This is the time that the CDPD network has to respond to the polling signal from the subscriber station to indicate that data is waiting for that subscriber station. If the subscriber station misses the waiting data by going back into the sleep mode, the subscriber unit may be de-registered from the CDPD network.

Once the M-ES has completed CDPD communication, it may appear to go into the sleep mode once again and the network may interpret the M-ES as being asleep again even if the M-ES functions once again in the AMPS mode. For such operation, different values are appropriate for the T203, T204 and N204 parameters than those values for an M-ES actually using the CDPD sleep mode in its intended power conservation function.

In practice, the aforementioned operation performs best if the value for the parameters T203 is smaller than that used for the CDPD sleep mode. Consequently, it does not take very long for the network to interpret the M-ES as being in the sleep mode. This is necessary to facilitate a quick response to incoming AMPS communications without losing registration on the CDPD network. The adjustment of the T203 parameter to accommodate the operation of a subscriber station M-ES is particularly important in light of the fact that it is common for many AMPS systems to repeat communication pages on the control channel once every eight seconds. Consequently, it is desirable for a subscriber station to be subjected to a parameter T203 that permits the subscriber station to change modes and check the AMPS control channels in synchronization with the AMPS pages.

If parameter T203 is sufficiently large, the subscriber station M-ES shifts modes to monitor the AMPS control channels during the duration of the T203 time frame. Thus, there is a chance that an indication of incoming CDPD communication for that subscriber station will be lost during the sojourn on the AMPS communication channel. Also, there is a chance that the AMPS page may be missed during the change in the modes from AMPS to CDPD. Optimum operation requires a setting of the T203 parameter based upon the operation of the AMPS paging system.

For optimum operation, the values of N204 and T204 should be larger than those used during the normal CDPD sleep mode. This defines the length of time an M-ES can have its radio tuned to a non-CDPD channel or function in the AMPS mode without risk of losing the incoming CDPD data. Thus, it is necessary for each E-MS station to control these parameters, especially the T203 parameter.

Such control can be carried out by the M-ES, either manually or automatically. Using automatic control, control is carried out in response to the amount of AMPS usage experienced by a particular M-ES. Thus, the mobile data base station does not have to configure its operation based upon generalized statistical analysis of AMPS versus CDPD usage of all user stations associated with an MD-IS serving the M-ES. Rather, this parameter selection is the responsibility of each M-ES. The values of the T204 parameters are conveyed from each M-ES to the MD-IS in the same manner as for the T203 parameter. However, these parameters can be sent in any known manner convenient to the normal exchange of data between a mobile station and a base station.

In accordance with Version 1.1 of the CDPD specification, Part 403, parameter T203 is set by the CDPD system as either thirty seconds or zero. Thus, in most cases, the CDPD system will be operating with a parameter T203 variably set at ten seconds. The subscriber stations M-ES are not able to vary this value. Further, the parameter T204 is set up by the network and is not subject to variation by the individual subscriber units. Normally, the parameter T204 is set by the network to be between twenty and 250 seconds. Usually this parameter is approximately one minute.

The parameter N204 is not adjustable by the subscriber stations. However, subscriber stations are permitted to request variations in this parameter from the CDPD network. Parameter N204 is normally set at a value of five. However, values of four and six are also common.

Normally when a subscriber station registers with the CDPD system, the CDPD system sets the parameter T203 at thirty seconds. If the subscriber station undergoing the registration procedure wishes to have a smaller T203 parameter, a request must be made to the CDPD system. This is done as part of the TEI request message. This process is described as the XID negotiation in Version 1.1 of the CDPD specification, Part 403, page 53, Table 403-8. Normally a subscriber station can request a T203 parameter as low as ten seconds. This is the minimum T203 value permitted in the current CDPD administrative environment (as mandated by the CDPD characters). Thus, most CDPD systems operate under this constraint.

In this CDPD environment and an AMPS environment in which pages are repeated every eight seconds, the subscriber station faces severe conflict between listening for AMPS paging signals and CDPD indications of incoming data communications. Based upon the aforementioned timings of the paging signals as indicated by the eight second parameter for AMPS and the T203 parameter of ten seconds, the subscriber station is away from the AMPS channel too long if it is to assure itself of 100% probably of receiving all CDPD incoming messages.

To accommodate this environment, in accord with a second aspect of the invention, the subscriber station M-ES synchronizes with the T204 timer (the timer that causes the CDPD network to send out its TEI notification messages informing the sleeping subscriber station that there is CDPD data waiting for them). The subscriber station then changes modes, coming back from the AMPS control channel approximately three seconds before the expiration of the T204 timing period so that the subscriber station is on the CDPD control channel to receive any TEI notification messages. If there is no TEI notification message for the subscriber station within approximately five seconds after the expiration of the T204 time frame, the subscriber station returns to the AMPS control channel and monitors AMPS paging signals.

A difficulty exists in that if the subscriber station fails to detect a TEI notification message N times in a row (where N is the N204 parameter less 1 and N204 is the number of times network will repeat a TEI notification message), the subscriber station must re-synchronize with the T204 timer. This operation may take up to 255 seconds (the value of the T204 parameter), although a time duration of between thirty and ninety seconds is more likely. Because of this time loss, there is a significant chance of missing any incoming AMPS calls while the subscriber station is attempting to re-synchronize on the CDPD control channel. The chance of missed AMPS calls is also increased by the CDPD data missed during the re-synchronization process, requiring retrieval of CDPD data before returning to the AMPS mode of communication.

A significant feature of the invention is the operation of switching back and forth between AMPS and CDPD communication based upon synchronization with the AMPS paging cycle and the CDPD TEI notification cycle. This can be done even in the presence of an AMPS telephone call that pre-empts all CDPD communication. The subscriber station could compare the duration of the AMPS call to the time period defined by the product of N204 and T204 to determine if it is necessary to check for registration on the CDPD network. If it is necessary to check for registration, this can be carried out as detailed in Part 405 (Cell Transfer) in the CDPD specification, Version 1.1.

Because synchronization is so critical in order to carry out the mode switching of the present invention, a problem exists in that there is no way to be certain that the TEI notification messages will be exactly T204 seconds apart, since they can be buffered in the Mobile Data Base Station (MDBS) behind other data that is waiting to go out. Consequently, the operation of this embodiment of the present invention is predicated on the assumption that the TEI notification will not often be delayed more than two seconds from the time they are supposed to go out. Such a limitation will also aid in facilitating the MD-IS MDLP re-transmission timers which operate on the order of five seconds. Consequently, this limitation is viable in the operation of the CDPD system under the aforementioned administrative environment.

Cell transfer and the channel hopping that goes along with it, whether planned or unplanned, introduce additional timing problems. The CDPD specification does not require that all the cells have the same timing for the T204 parameter, or that the timing of T204 be in synchronization across the various cells. However, in a reasonable CDPD system, the parameter T204 preferably is the same for every cell controlled by the same MD-IS. Further, if the value of N204 is changed based upon requests from individual subscriber stations, this value would in -general be uniform for all cells controlled by particular MD-IS until such requests are made. This eases the synchronization problems in general.

The MD-IS controlling the various MDBS or CDPD cell site can implement the uniform T204 parameter and the synchronization of the timers counting out the duration of this parameter across the various cells under the control of the MD-IS. This can be effected using well known techniques when exchanging data as specified in the CDPD specification, incorporated herein by reference as background material. Likewise, synchronization of the T204 parameter between the MDBS and the subscriber stations being serviced by each MDBS can also be carried out using well known techniques, such as those adopted for use when the subscriber station registers with an MDBS.

Normally, when a subscriber station completes a cell transfer, it sends a polling message to the CDPD network indicating that the subscriber station has changed channels. This polling message also indicates to the CDPD network that the subscriber station is "awake". Consequently, the subscriber station is supposed to stay "awake" on the CDPD control channel for at least T203 seconds after the subscriber station receives the CDPD network response to a polling message. Otherwise, if the serving MD-IS has data to deliver to the subscriber station before the subscriber station is expected to go back to the sleep mode, the MD-IS (CDPD system) will attempt to deliver the waiting data immediately. If the attempt to deliver the subject data to the subscriber station is unsuccessful (because the subscriber station is no longer on the CDPD control channel), that subscriber station will be de-registered with the CDPD system. Thus, there is a strong motivation for the subscriber station to remain on the CDPD control channel for a minimum of ten seconds as defined by the T203 parameter. However, this time spent exclusively on the CDPD control channel clearly involves some risk of losing incoming AMPS calls, especially in an environment where cell transfers (which require that the aforementioned process to be carried out) are relatively frequent.

In order to avoid the possibility of missing an AMPS communication, it is necessary in the present invention to switch modes to the AMPS control channel during the time frame designated by the T203 parameter. The purpose of this shift from the CDPD mode to the AMPS mode is to remain away from the AMPS control channel for a total of less than approximately seven or eight seconds to avoid the risk of missing a re-transmission of an AMPS paging signal after a cell transfer has taken place. Assuming that the cell transfer is completed in approximately one second (in accordance with the CDPD Specification, Version 1.1, Section under Radio Resource Management), and that the CDPD network takes approximately two seconds to respond to the polling message sent by the subscriber station which has just completed the cell transfer, then an effective window of approximately five seconds exists for the subscriber station to change modes and monitor an AMPS control channel. In the preferred embodiment of the invention, there is the possibility of CDPD deregistration during the five seconds when the subscriber station is tuned to an AMPS control channel. However, this possibility is considered sufficiently small as to be practical within the context of the embodiment.

Because of the aforementioned possibility of deregistration with the CDPD system, another feature of the invention provides a process of checking for CDPD registration periodically. Representative time periods are every five minutes or every ten minutes. However, other time periods could be used as deemed appropriate based upon the activity in both the CDPD and AMPS systems. During registration check, the subscriber station will remain tuned to the CDPD control channel during the entire duration of the time period defined by the T203 parameter. While this means that the subscribe station runs the risk of losing an AMPS communication during the time frame defined by the T203 parameter, this is an acceptable risk if conducted once every five minutes. The risk is made more acceptable by the fact that if de-registration from the CDPD system occurs for the subject subscriber station, the re-registration process will entail a much greater risk of losing an incoming AMPS call directed to the subject subscriber station.

Using another feature of the present invention, when the subscriber station determines that a transfer is necessary, it will return to the AMPS control channel for at least the interval between AMPS pages before coming back to the CDPD channel and running cell transfer algorithm that is specified in Part 405 of the CDPD specification. Normally, cell transfer does not take place for a subscriber station in the CDPD sleep mode.

A sleeping subscriber station does not run the RSSI scan procedure until it is ready to transmit. This is not a problem since such a subscriber station is not transmitting and therefore is not causing reverse channel interference. However, it is important that the sleeping subscriber station does not move so far from the MDBS that the subscriber station is unable to receive the TEI notification messages. This problem can be alleviated by using some block error rate (BLER) criteria that can be checked by the subscriber station while checking for the TEI notification from the MDBS.

In order to provide proper synchronization of the T204 parameter timing, cell transfer should take place as quickly as possible. Thus, it is necessary to keep the cell transfer data base up to date. Otherwise, the subscriber station will fall back into the initial acquisition of this data due to insufficient adjacent cell information. This is not a problem with initial registration and synchronization since enough time will be allowed for the cell transfer data base of the RRME to be constructed. However, it is a problem with cell transfer.

In accord with another aspect of the invention, upon cell transfer, the subscriber station alternates between the AMPS control channel and the CDPD control channel in a pattern that covers the entire RSSI scan interval as quickly as possible to rebuild the cell transfer data base from the cell configuration message scanned during the RSSI interval.

Normally, the RSSI scan interval is sixty seconds and can encompass the cell configuration message. If there are more than one CDPD channel stream in a particular cell, a subscriber station undergoing an undirected hop should pick up the channel stream ID message, transmitted every five seconds. If the channel stream has changed, the subscriber station is required to send a polled RR message to the CDPD system. The subscriber station that has just performed a channel hop must rebuild the cell transfer data base based upon the characteristics of the new cell. This is difficult to do quickly due to insufficient adjacent cell information and the time necessary to obtain the cell configuration message provided as part of the RSSI scan. In order for the subscriber station to check for the proper channel stream ID, the RSSI scan time should be divided into five second slots. The subscriber station will alternate between monitoring the AMPS control channel and the CDPD channel on successive time slots. Such an arrangement allows the entire channel configuration message to be obtained in a plurality of RSSI scan periods.

However, switching between the CDPD mode and the AMPS mode is not instantaneous. A finite amount of time will be lost each time a mode switch takes place. Thus, more than two RSSI scan periods will be used to obtain the entire channel configuration message, and irregular intervals for scanning the CDPD channel for the cell configuration message used. For example, the first CDPD scan can cover the one-five second time slot. The second CDPD scan can cover the fifteen-twenty second time slot. The third can cover the thirty-thirty five second time slot, with this pattern being continued until the end of the first RSSI scan period of sixty seconds. In the second RSSI scan period, the subscriber station monitors the CDPD channel in the five ten second time slot, the twenty-twenty five second time slot, etc. In the third RSSI scan period the subscriber station monitors the CDPD channel during the ten fifteen second time slot, the twenty-five-thirty second time slot, etc., until the subscriber station has monitored each time slot of the RSSI scan period and has obtained all the cell configuration data therein.

Figure 6:
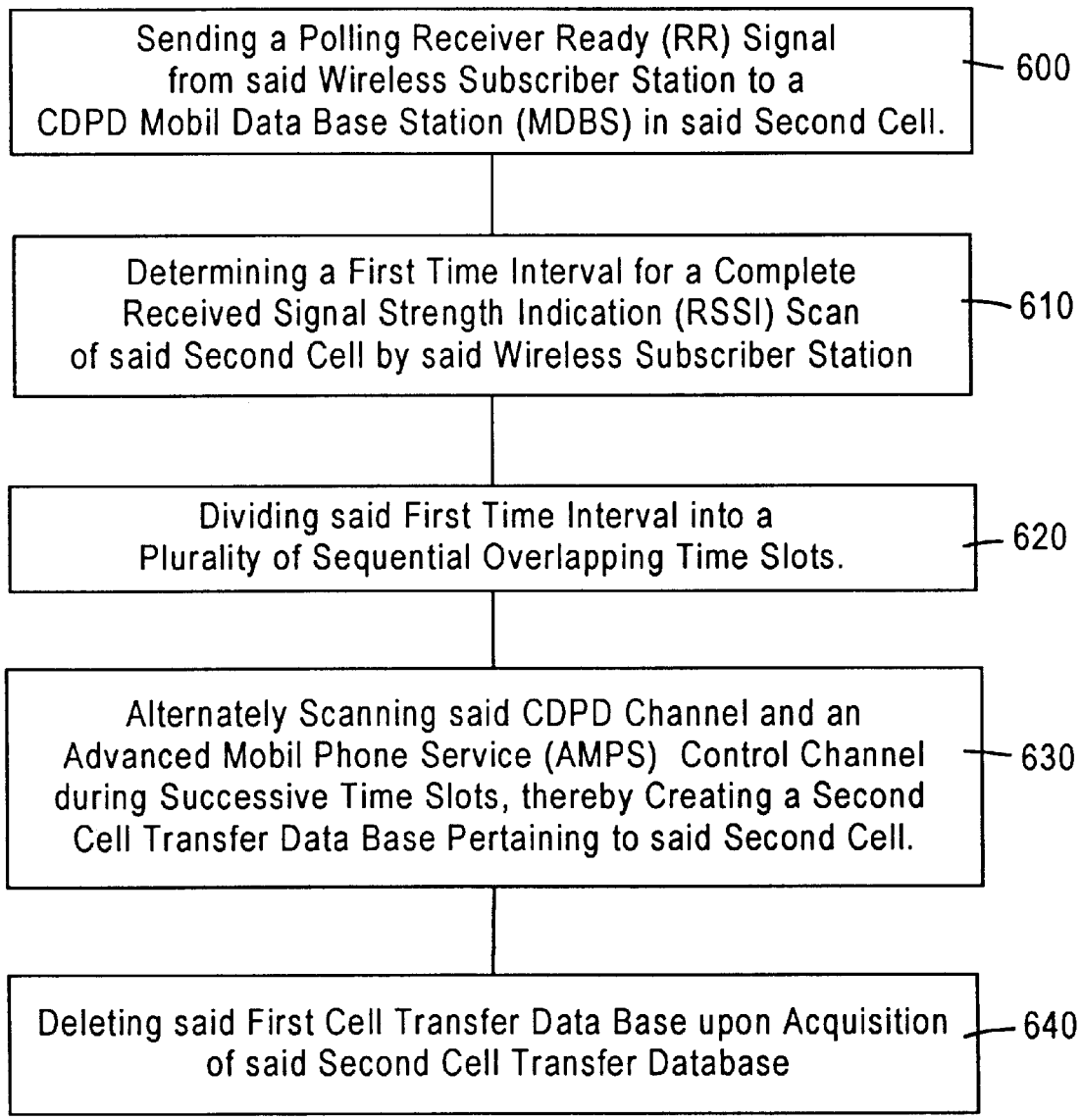
FIG. 6 is a flow chart of a method of effecting handoff of a wireless subscriber station from a first cell to a second cell in accordance with one aspect of the invention.

FIG. 6 is a flow chart of a method of effecting handoff of a wireless subscriber station from a first cell to a second cell in accordance with one aspect of the invention.

The method includes sending a polling receiver ready (RR) signal from said wireless subscriber station to a CDPD mobile database (MDBS) in a second cell (600). The subscriber station then determines a first time interval for a complete received signal strength indication (RSSI) scan of said second cell by said wireless subscriber station (610). The subscriber station divides said first time interval into a plurality of sequential overlapping timeslots (620) and alternately scans the CDPD channel and an Advance Mobile Phone Service (AMPS) control channel during successive timeslots to create a second cell transfer database pertaining to said second cell (630). Upon acquisition of said second cell transfer database, the first cell transfer database is deleted (640).

Figure 7:
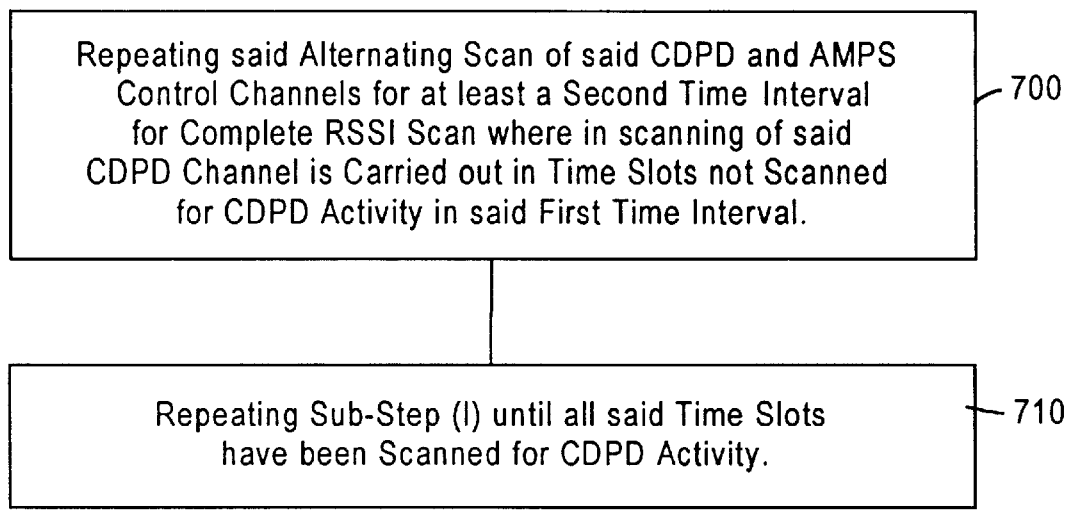
FIG. 7 is a flow chart showing an alternative method of creating a second cell transfer database shown in FIG. 5.

FIG. 7 is a flow chart showing an alternative method of creating a second cell transfer database shown in FIG. 5. Step 630 of FIG. 6 may be implemented by repeating the alternating scan of the CDPD and AMPS control channel for at least a second time interval for a complete RSSI scan in which scanning on the CDPD channel is carried out in timeslots not scanned for CDPD activity in step 610 of FIG. 6 and repeating step 700 until all timeslots have been scanned for CDPD activity (710).

Because of the time necessary to rebuild the cell transfer database, this aspect of the invention operates to maintain the previous cell transfer database while acquiring a new cell transfer database using the RSSI 193 scan described above. This can be determined from the cell configuration message obtained before transfer to the present cell. Thus, the change of modes back to the CDPD mode from the AMPS mode to obtain the channel stream ID is unnecessary, and a different timing scheme can be arranged. For example, instead of changing modes every five seconds, the subscriber station could spend seven seconds on the CDPD channel alternating with fourteen seconds on the AMPS control channel.

If the subscriber station goes through an undirected hop to a cell with more than one active data stream, the subscriber station should stay on the CDPD channel as long as possible (up to the allowable time away from the AMPS control channel, i.e., approximately eight seconds) or until the subscriber station has seen both the TEI notification and the channel configuration message. If the subscriber station cannot stay on the CDPD control channel long enough to receive the aforementioned data, the subscriber station should attempt to stay on the CDPD control channel long enough to obtain this information the next time that the subscriber station checks for the TEI notification. This technique should be viable since the recommended interval between channel configuration messages (as specified in the CDPD Specification, Version 1.1) is five seconds.

An appropriate safety measure in the operation of such a system is that the subscriber station check any channel configuration message to verify that the subscriber station has not changed channel streams within the same cell. If the subscriber station determines that it has changed channel streams within the same cell, the station should go back to the AMPS control channel for the minimum acceptable period before returning to the CDPD channel and completing the channel hop. The subscriber station should poll the CDPD network to let it know that the subscribe station is on a different channel stream. Otherwise, the transfer is handled in the same manner as previously described (including the switch over from a CDPD control channel to an AMPS control channel during the time frame defined by T203).

To aid optimal performance of the aforementioned, the configuration timer (as described in the CDPD specification, Parts 406 and 507) should be set for a long duration, preferably an hour or more. A longer configuration time or duration period will result in fewer chances of losing incoming AMPS calls since the configuration timer will operate less often.

Although a number of arrangements of the present invention have been mentioned by way of example, it is not intended that the invention be limited thereto. For example, the present invention can be adapted for use with a variety of different parameter values and administrative environments. Accordingly, this invention should be considered to include any and all configurations, modifications, variations, combinations or equivalent arrangements falling within the scope of the following claims

What is claimed is:

1. A method of affecting handoff of a wireless subscriber station from a first cell to a second cell in a Cellular Digital Packet Data (CDPD) system, where said wireless subscriber station contains a first cell transfer database pertaining to radio frequency characteristics of said first cell, said method comprising steps of:

(a) sending a polling receiver ready (RR) signal from said wireless subscriber station to a CDPD Mobile Data Base Station (NDBS) in said second cell;

(b) determining a first time interval for a complete Received Signal Strength Indication (RSSI) scan of said second cell by said wireless subscriber station;

(c) dividing said first time interval into a plurality of sequential overlapping time slots;

(d) alternately scanning said CDPD channel and an Advanced Mobile Phone Service (AMPS) control channel during successive time slots, thereby creating a second cell transfer data base transfer data base pertaining to said second cell; and (e) deleting said first cell transfer database upon acquisition of said second cell transfer database.

2. The method of claim 1, wherein step (d) comprises substeps of:

(i) repeating said alternating scan of said CDPD and AMPS control channels for at least a second time interval for a complete RSSI scan wherein scanning on said CDPD channels is carried out in timeslots not scanned for CDPD activity in said first time interval; and (ii) repeating sub-step (i) until all said time slots have been scanned for CDPD activity.

3. The method of claim 2, wherein each said time slot has the same time duration.

4. The method of claim 3, wherein said time slot duration is selected based upon intervals between transmission channel stream identification messages broadcast by said MDBS in said second cell.

5. The method of claim 2, wherein step (a) comprises the sub-steps of determining the number of CDPD channel streams existing in said second cell.

6. The method of claim 5, wherein said time slots are selected to be of unequal duration when said wireless subscriber station determines that a single CDPD channel stream exists in said second cell.

7. The method of claim 6, wherein said time slots used for scanning for AMPS activity have a greater duration than time slots used for scanning for CDPD activity.

8. The method of claim 2, further comprising the steps of:
(f) selecting a second time interval greater than said first time interval; and (g) sending a polling RR from said subscriber station to said MDBS once during each of said second time intervals.

9. The method of claim 2, wherein said second time interval has a duration in the range of five minutes to one hour.

* * * * *